April 16, 1963   M. L. NATLAND   3,085,957
NUCLEAR REACTOR FOR HEATING A SUBSURFACE STRATUM
Filed Dec. 26, 1957
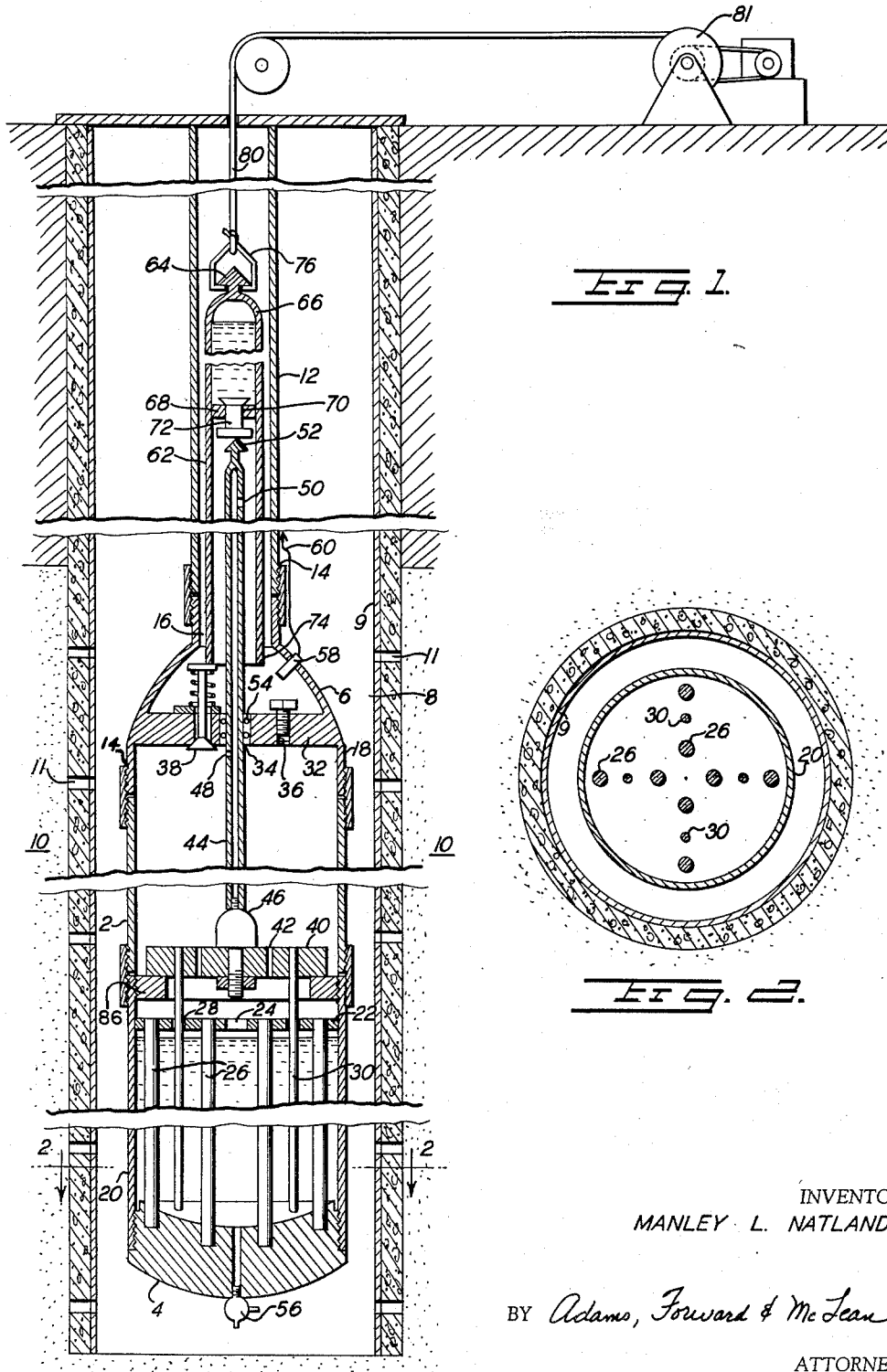
INVENTOR
MANLEY L. NATLAND
BY Adams, Forward & McLean
ATTORNEY

United States Patent Office 3,085,957
Patented Apr. 16, 1963

3,085,957
NUCLEAR REACTOR FOR HEATING A
SUBSURFACE STRATUM
Manley L. Natland, Rolling Hills, Calif., assignor to Richfield Oil Corporation, Los Angeles, Calif., a corporation of Delaware
Filed Dec. 26, 1957, Ser. No. 705,369
4 Claims. (Cl. 204—193.2)

The present invention pertains to an apparatus useful in heating underground formations for instance to improve the recovery or for secondary recovery of oil and gas from a subsurface oil-bearing stratum. More particularly, the present invention relates to apparatus including a nuclear reactor positioned in a well bore for the purpose of applying heat and in some cases heat with solar temperatures to the subsurface stratum, the apparatus being particularly adapted to initiate and in some cases control a self-sustained nuclear reaction. Fast reactors generating solar heat may also be used to fracture oil and gas reservoir beds.

Numerous methods for heating oil-bearing sands have been proposed such as by the circulation of a heated fluid through the bore hole, by the generation of heat adjacent or within the stratum by chemical means, by the suspension of electrical heating means in the well and by the ignition of oil or gas in the lower portion of a well bore or in the adjacent stratum. However, all of these methods are attended with certain difficulties, for instance, the loss of heat to overlying strata is excessive in the circulating fluid methods. When directly firing oil or gas in the bore hole, provision must be made for piping fuel and air to a bottom of the well and frequently an ignition means must be strung within the well tubing. Ignition devices are difficult to operate and are unreliable, particularly when a well is under substantially elevated temperatures and pressures. Chemical methods of heating underground strata are difficult to control from the earth's surface over substantial periods of time and the high voltages necessary to obtain the desired temperatures by electrical heating means can give rise to insulation difficulties at the temperatures encountered at substantial depths.

According to the present invention I have provided an apparatus for applying any desired degree of heat to an underground stratum, e.g. an oil-bearing formation, said apparatus being compact and easily controlled. Only light reactor cores without shielding are used since the reactor is activated at the bottom of the well. The apparatus of the present invention can find particular utility in those areas of the world wherein is noted a scarcity of heat sources such as in recovering oil from the Athabasca tar sands located in Canada. Although finding particular usefulness in these areas, the invention is useful in other areas as well, wherein heating of a well bore is desired, such as to improve the recovery of oil from the bore hole by reduction in viscosity, and to heat an input well in a thermal recovery process where production is taken from one or more output wells. More particularly, I have provided a nuclear reactor which can be positioned in a well bore hole remotely or at any substantial distance from the earth's surface and specifically I have provided an apparatus which is especially useful in initiating and controlling a selfsustained nuclear chain reaction taking place within the thus positioned nuclear reactor, the control providing a means to regulate the rate of fission and ultimately the temperature within the bore hole. This temperature will usually be in the range of about 300° F. to 2000° F., and preferably from about 400° F. to 1500° F.

It is generally known that the bombardment of fissionable isotopes such as U–239, U–233 and U–235 with neutrons will result in the fission of the isotope nuclei accompanied by a large production of energy in the form of heat, and the release of about two fast or high energy level neutrons which are in turn capable of causing additional fission. If the fissionable material is present in greater than critical mass and the neutron densities attain a certain predetermined minimum level, above unity ($K<1$), a self-sustained nuclear chain reaction can be obtained. Since the neutrons released as a result of the fission process have very high energy levels they are only difficultly absorbed by other fissionable nuclei and hence the fissionable nuclei concentration must be relatively high, e.g. pure U–235 or highly enriched natural uranium, if the self-sustained reaction is to be attained using fast neutrons as the source of fission. However, if the high energy level neutrons are slowed to what is termed the thermal velocity of the system they are rendered much more prone to capture or absorption by the fissionable nuclei and thus a much lower concentration of fissionable nuclei, e.g. natural uranium or only slightly enriched natural uranium, can be utilized to attain a self-sustained reaction. This slowing down or thermalizing of the neutrons is accomplished by introducing a neutron moderator into the reaction zone. For example, heavy water, i.e. $D_2O$, and in some instances, plain water or light hydrocarbons, and solid moderators such as beryllium or graphite serve to moderate or slow down the high energy level fission neutrons. If a liquid moderator is used the fissionable elements are generally immersed therein and if a solid moderator is utilized the fissionable material is frequently dispersed in solid slugs or bodies through what is termed a lattice of the solid moderator. In either case the moderator serves to reduce the energy levels or velocities of the fission neutrons by elastic collision with the nuclei of the moderating material to velocities approximating about 8,000 feet per second.

The fission of the nuclei produces large amounts of energy in the form of heat. Usually in order to make practical use of the nuclear reaction and the subsequent production of heat it has been necessary to devise means of controlling the rate of fission except in the case of a fast reactor where solar temperatures are desired, or fracturing is an objective. Generally, this has been accomplished by controlling the neutron density or flux within the reactor and hence the rate of fission by one or a combination of the following means: (1) variations in the concentrations of the nuclear fuel, (2) neutron absorbers or control rods, (3) fuel geometry, (4) variations in a neutron reflector position and (5) variations in the amount of moderator in the reactive core.

The theories and relationships governing reactor and particularly thermal reactor operations, such as critical dimensions, amounts of fissionable material, moderator characteristics, etc. are set forth in the patent to Fermi et al., U.S. No. 2,708,656, and need not be gone into at this point since in general the present invention is concerned not with a particular size or power output reactor but rather to means and apparatus useful in initiating the chain reaction and furnishing a control thereover when the reactor is located at a substantial distance from the point of control such as below the surface of the earth in a well bore.

The apparatus of my invention provided for heating an underground formation includes a nuclear reactor inserted into a well bore either cased or uncased and positioned in the vicinity of a stratum to be heated. The nuclear reactor can preferably be of the thermal type and can be provided with a liquid moderator such as, for example, heavy water, and the neutron density or flux and ultimately the rate of fission can be controlled by the insertion or withdrawal of a neutron absorber, e.g. cadminum or boron, into or out of the liquid moderator. More specifically I have provided a reactor of the above-identified type which is capable of being so positioned while the reactor is at a sub-critical level and thereafter when desired, the reactor can be made critical or self-sustained by the introduction of a liquid neutron moderator into the reactive core or tank and the neutronic reaction can thereafter be controlled to any desired power or heat output by the insertion or withdrawal of an absorbing or control rod or rods into or out of the moderator, both the introduction of the moderator and the subsequent control being effected from the surface of the earth.

More specifically the present invention may best be understood by reference to the following drawings wherein:

FIGURE 1 is a cross-sectional view of my generally cylindrical nuclear reactor positioned in the well bore and the apparatus necessary to effect the startup and control of the chain reaction and FIGURE 2 is a cross-sectional plan view taken through line 2—2' of FIGURE 1.

Referring now to FIGURE 1 the nuclear reactor comprises an elongated cylindrical chamber 2 closed at its bottom as by plug 4 and at its top as by cap 6. Chamber 2 can be composed of any heat-resistant material such as a suitable ceramic or an alloy steel and can be provided if found necessary or expedient with a layer of neutron reflecting material (not shown) thereon such as zirconium having admixed therethrough particles of boron carbide. Chamber 2 is suspended and held in position within the bore hole 8 opposite the desired oil-bearing stratum 10 by a tubing string 12 attached to cap 6 as by threads 14. As shown in the drawing, bore hole 8 is provided with a cemented steel liner 9, the steel liner 9 having cement outside of the same to form a cased hole as is conventional in oil field practice and having perforation 11 therethrough in the area of the oil-bearing stratum. It is to be understood, however, that the apparatus of the present invention is capable of use in an uncased bore hole, if desired. Cap 6 is constructed so that there is maintained communication between the interiors of chamber 2 and string 12 as through opening 16.

Chamber 2 is separated into an upper section 18 and a lower reactive section 20 by means of partition 22 having opening 24 in the center thereof. Lower section 20 contains fissionable elements 26 and they can be held in position within section 20 by fixed connections as to partition 22 and bottom plug 4. The total mass of fissionable material contained in elements 26 will, of course, at least equal the critical mass of the particular system and the elements will be arranged in a predetermined geometry within the core, all of which can be calculated or ascertained by the application of familiar principles. The fissionable elements 26 will be composed of fissionable material such as U-235 and this can be greatly diluted as with natural uranium, i.e. U-238. For instance, U-235 can be present in the elements 26 in concentrations of about 0.7 percent or more with the balance being non-fissionable U-238. The mass of U-235 necessary for a self-sustained nuclear reaction can be determined as by the expotential pile method of desired. This mass will usually be in a range of about 2 to 500 pounds depending upon the particular geometry of the system.

The elements 26 will preferably be contained in a thin sheath (not shown) of stainless steel or other similar material which is substantially non-corrosive to the liquid moderator and which will prevent the contamination of the moderator with the resultant fission fragments. The elements 26 can be constructed in any convenient manner such as by providing elongated solid rods of fissionable material surrounded by the aforementioned sheath or by inserting into the sheath a series of small slugs, one to three inches in length, of the fissionable material. The use of a series of small slugs is the preferred mode of operation since warping of the fissionable rods is overcome and the recharging of the reactor is facilitated.

Partition 22 is further provided with a plurality of openings as at 28 through which slidably extend the hereinafter described neutron absorbing rods 30. In the upper section 18 is provided a horizontal plate 32 having a centrally located opening 34 therethrough, pressure relief valve 36 and spring biased valve 38 thereon. This plate can be provided at any convenient location in section 18 but I prefer, as shown in FIGURE 1 that it be located as far upwardly as possible in upper section 18. In any event, it must be located a sufficient distance above partition 22 to permit substantial withdrawal of neutron absorbing rods 30 from lower section 20. The neutron absorbing rods 30 extending downwardly into section 20 are fixedly suspended from plate 40 in any convenient manner.

Rods 30 can be composed of any suitable material which has a high neutron capture cross-section such as boron or cadmium. The concentration of the material in the rods or the total amount of this material which can be introduced into the reactive section will be such that upon complete introduction into section 20 a sufficient amount thereof will be present to furnish a completely safe reactor design. That is, the neutron absorbing material will be present in amounts sufficient to lower the neutron density below unity so that the reactor will be sub-critical or non-self-sustained, even though the critical mass of fissionable material and moderator be present. Again, the amount of the absorbing material necessary to accomplish this purpose in the particular reaction system can be calculated by known principles.

Plate 40 covers a substantial portion of the cross-section of chamber 18 but is freely reciprocable therein and has further provided one or more holes 42 therethrough. The plate is centrally affixed to hollow tube 44 extending upwardly from plate 40 through opening 34 in plate 32 and opening 16 in cap 6 and into tubing string 12. Tube 44 can be affixed to plate 40 as by coupling 46. Tube 44 is provided with breather port 48 immediately below the point at which tube 44 passes through plate 32 and a second port 50 at a point above plate 32 when tube 44 is in its lowermost position. The upper end of tube 44 is constructed so that it is capable of being held by a grappling latch means lowered from the surface of the earth on a line. Preferably, the end of tube 44 is constructed, as shown, in a spearhead 52 which is capable of being grasped as by an overshot latch 76 lowered into the tubing string 12 by line 80 and above surface winch 81. Other means could, of course, be provided for lowering line 80. In order to form a tight slidable seal between opening 34 in plate 32 and tube 44 I have provided O-ring seals as shown at 54.

Lower section 20 of chamber 2 is designed as a tank to contain the liquid moderator, e.g. heavy water, for instituting and maintaining the nuclear reaction and which is introduced into the tank when desired as hereinafter described. Since the liquid moderator may be corrosive, tank 20 can be lined as with a non-corrosive metal. Bottom plug 4 can be provided with liquid drainage valve 56 if desired for facilitating the removal of the liquid moderator when the reactor is at the earth's surface. Located in the cap 6 I have also provided thermowell 58 connected to the surface by a suitable cable 60 in order to record the temperature of the fission reaction. Thermowell 58 can, of course, be provided at any convenient location in or near chamber 2.

The apparatus described thus far constitutes the nuclear reactor per se and it can be constructed in accordance with the principles known to the art, and as exemplified in the patent to Fermi et al., U.S. No. 2,708,656. For instance, the critical size of the cylindrical reaction chamber can be calculated by applying the principles taught in Stephenson, "Introduction to Nuclear Engineering," 1954, or the above-noted patent, taking into consideration the desired power output or temperature of the reactor, the type of concentration of fissionable isotopes, neutron moderator, neutron losses from the system, and other factors which go to constructing a self-sustained thermal nuclear reactor.

In order to effect the initiation and control of the reactor as described above, I provide a cylindrical tube 62 of a diameter sufficient to fit freely inside tubing string 12 and having its upper end 64 adapted to be grasped. As illustrated this upper end takes the form of a spearhead. Of course, any other convenient form of construction can be provided. Tube 62 is provided with a liquid-containing compartment 66 by inserting a plate 68 across the tube. Liquid compartment 66 must be of a capacity sufficient to contain the necessary quantity of liquid moderator, e.g. heavy water, for use in the nuclear reactor. Again, the capacity of this chamber and the amount of liquid moderator necessary, will vary for the particular system and this can be calculated by the application of known principles. Centrally located in plate 68 I provide an opening 70 having a gravity check valve 72 seated therein. The length of tube 62 can be any that is found convenient provided that the capacity of the compartment 66 is as described above and further provided that the lower or leading edge 74 of tube 62 will engage spring biased check valve 38 on plate 32 upon downward movement of tube 62, thus unseating valve 38. When thus unseated, the distance between edge 74 and gravity valve 72 will be such that spearhead 52 of hollow rod 44 will unseat valve 72. In order to lower tube 62 into bore hole 8 and tubing string 12, I can provide any convenient means such as an overshot latch as shown at 76 attached to the end of line or cable 80 and lowered into the tubing string 12 as by winch 81 or other similar means.

FIGURE 2 is a cross-sectional plan view of the reactor taken through line 2—2' of FIGURE 1 and shows the spatial arrangement of the neutron-absorbing rods 30 inserted between the fissionable elements 26. Although only eight fissionable elements and four absorbing rods are here shown, it must be understood that more or less thereof can be provided if desired or found necessary.

The operation of the above-described apparatus is as follows. The chamber 2 is lowered into the cased bore hole 8 by means of the tubing string 12 and positioned opposite the desired oil-bearing stratum 10. When initially lowered and positioned, chamber 2 will be devoid of the liquid moderator and the neutron absorbing rods 30 will be fully inserted into active section 20. When thus lowered into position, the reactor although containing the critical mass of fissionable material necessary to provide a self-sustained thermal neutronic reaction will nevertheless be sub-critical due to the absence of the moderator and the further protection of the fully inserted control or neutron absorbing rods 30. After the reaction chamber 2 has been so positioned, tube 62 containing the necessary quantity of liquid moderator in compartment 66 is lowered down the inside of tubing string 12 by means of winch 81 and line 80. The lower edge 74 of tube 62 contacts spring biased valve 38 and upon further lowering serves to depress the valve from its seat on plate 32. As edge 74 depresses valve 38 spearhead 52 contacts and lifts valve 72 from its seat in plate 68. As valve 72 is lifted the moderator in compartment 66 flows downward by the force of gravity and passes into chamber 2 through depressed valve 38. The moderator flows through upper section 18, opening 42 into plate 40 and opening 24 in plate 22 and thus into the reactive section 20 of chamber 2. When the liquid moderator has drained from compartment 66 and into reactive section 20, tube 62 is withdrawn from string 12 thus leaving rod 44 free and standing clear in the tubing string 12. The air displaced by the introduction of the moderator can escape through ports 48 and 50 in tube 44. At this point the reactor will still remain sub-critical even though the critical amount of fissionable material and moderator is in the reactive core and this is due to the presence of the fully inserted absorbing rods 30. When in this position, plate 40 is held by ring stop 86 which keeps rods 30 from contacting plug 4.

When it is desired to initiate the chain reaction line 80 having overshot latch 76 attached thereto can again be lowered into the tubing string 12 as by winch 81 and caused to engage with spearhead 52 of rod 44. Rod 44 can be withdrawn to any extent desired thus raising the plate 40 and control rods 30 from the reactive section 20. When the rod 44 is withdrawn, port 48 will pass the O-ring seal 54 thus completely sealing chamber 2. As the control rods 30 are withdrawn the neutron flux within section 20 will be allowed to increase and thus the nuclear reaction can become self-sustained. The rate of fission taking place within reactor 2 can be directly correlated with the temperature rise and this can be indicated at the surface of the earth as through a thermocouple in thermowell 58, and cable 60 attached to a temperature registering device at the earth's surface (not shown). If the temperature exceeds a predetermined point indicating a dangerous rise in the rate of fission and hence a rise in neutron densities the control or absorbing rods 30 can be lowered back into the reactive section 20 to any extent necessary to reduce the rate of fission and hence the temperature to the desired level. By continual operation in this manner the reactor can be controlled to any desired power or heat output.

In order to supply a constant source of neutrons even while the reactor is at sub-critical levels, a suitable neutron source can be placed at any convenient location within active section 20. For instance, a neutron source as described in U.S. Patent No. 2,440,999 can be provided on bottom plug 4 if desired.

Since the heavy water moderator in the present system will tend to vaporize under the operating condition thus decreasing its usefulness as a moderator, I have provided pressure control valve 36 in chamber 2. By setting the pressure control valve at an optimum setting, I can provide sufficient pressure in chamber 2 to maintain the moderator in the liquid phase even at the elevated operational temperatures. For instance, the valve can be set to certain pressures of up to about 2000 p.s.i. This pressure control valve can, of course, be set at a pressure sufficient to provide an additional safeguard against a runway or super-critical reaction by allowing the vaporization of the moderator when the rate of fission increases too rapidly, thus slowing or stopping completely the reaction. The temperatures which can be attained using the presently described nuclear reactor are limited by the critical temperature of the liquid moderator. For instance, about 700° F. is the maximum temperature attainable using heavy water as the moderating medium.

What is claimed is:

1. An apparatus for heating a subsurface stratum which comprises a liquid moderated thermal nucleonic reaction means positioned in a well bore, said reaction means including a reactor tank, a plurality of elements of fissionable material in said tank, neutron absorbing material in said tank, means for inserting and withdrawing said neutron absorbing material from between said plurality of fissionable elements, means for lowering a container of liquid neutron moderating material into the bore hole to the vicinity of said reaction means, said container being provided with discharge valve means, means on said reaction means coacting with said discharge valve means for opening said discharge valve means by the lowering of said container to release said liquid neutron moderating material from said lowered container to said reaction tank and between said fissionable elements.

2. An apparatus for heating a subsurface stratum which comprises a liquid moderated thermal nucleonic reaction means positioned in a well bore, said reaction means including a reactor tank divided into an upper section and a lower section, a plurality of fissionable elements in said lower section, neutron absorbing material in said tank, means for inserting and withdrawing said neutron absorbing material from between said plurality of fissionable elements, said inserting and withdrawing means comprising a plate having suspended therefrom said neutron absorbing material and at the opposite surface thereof a rod extending upwardly through said upper section, means for lowering a container of liquid neutron moderating material into the bore hole and into the vicinity of said reaction means, said container being provided with a gravity discharge valve, positioned so that it is opened upon downward contact with said rod and means for introducing said moderator into the said lower section of said reactive tank upon release from said container.

3. An apparatus for heating a subsurface stratum which comprises a liquid moderated thermal nucleonic reaction means positioned in a well bore, said reaction means including a reactor tank divided into upper and lower sections by a plate having an opening therethrough, a plurality of fissionable elements in said lower section, neutron absorbing material in said tank, means for inserting and withdrawing said absorbing material from between said fissionable elements, said inserting and withdrawing means comprising a perforated plate having suspended therefrom said neutron absorbing material and affixed on the opposite side thereof a rod extending upwardly through said upper section, said upper section being divided with a second plate through which extends said rod, means provided in said second plate to permit liquid drainage therethrough, and means for lowering a container of liquid neutron moderating material into the bore hole and into the vicinity of said reaction means, said container being provided with a gravity discharge valve positioned so that it is opened upon downward contact with said upwardly extending rod.

4. The apparatus of claim 3 in which the drainage permitting means in said second plate comprises a spring loaded valve means which is opened by contact with said container when the container contacts said rod.

References Cited in the file of this patent
UNITED STATES PATENTS

| | | |
|---|---|---|
| 732,955 | O'Hara | July 7, 1903 |
| 797,384 | Thurston | Aug. 15, 1905 |
| 2,473,591 | Killner | June 21, 1949 |
| 2,780,449 | Fischer et al. | Feb. 5, 1957 |
| 2,825,688 | Vernon | Mar. 4, 1958 |
| 2,868,708 | Vernon | Jan. 13, 1959 |
| 2,873,242 | Treshow | Feb. 10, 1959 |
| 2,951,943 | Goodman | Sept. 6, 1960 |
| 2,952,019 | Goodman | Sept. 6, 1960 |

FOREIGN PATENTS

| | | |
|---|---|---|
| 1,147,517 | France | June 11, 1957 |